US007561202B2

United States Patent
Goto

(10) Patent No.: US 7,561,202 B2
(45) Date of Patent: Jul. 14, 2009

(54) IMAGE DEVICE WITH LENS ADJUSTMENT FOR VARIOUS ENVIRONMENTAL CONDITIONS

(75) Inventor: Makoto Goto, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 582 days.

(21) Appl. No.: 10/566,544

(22) PCT Filed: Aug. 17, 2004

(86) PCT No.: PCT/JP2004/011764

§ 371 (c)(1),
(2), (4) Date: Jan. 27, 2006

(87) PCT Pub. No.: WO2005/019897

PCT Pub. Date: Mar. 3, 2005

(65) Prior Publication Data

US 2006/0209195 A1 Sep. 21, 2006

(30) Foreign Application Priority Data

Aug. 21, 2003 (JP) .............................. 2003-297308

(51) Int. Cl.
*H04N 5/225* (2006.01)
*H04N 5/232* (2006.01)
*G02B 13/16* (2006.01)
*G02B 7/02* (2006.01)

(52) U.S. Cl. ....................... 348/357; 348/335; 359/814; 359/820; 359/824

(58) Field of Classification Search .............. 348/208.8, 348/208.11, 208.2, 208.12, 244, 335, 357, 348/374; 396/512, 813, 814, 820, 824

See application file for complete search history.

(56) References Cited

U.S. PATENT DOCUMENTS 5,614,983 A * 3/1997 Iwane et al. ................... 396/97
5,900,995 A * 5/1999 Akada et al. ................ 359/824

(Continued)

FOREIGN PATENT DOCUMENTS

JP          8-68933 A      3/1996

(Continued)

Primary Examiner—John M Villecco
(74) Attorney, Agent, or Firm—Cohen Pontani Lieberman & Pavane LLP

(57) ABSTRACT

A digital camera 100 including a lens unit 1a, and a first actuator 71 and a second actuator 72, which deform by being supplied with electric power, thereby moving the lens unit. The digital camera 100 includes a ROM 12 which stores stop position data in which the operation amount of the actuators for moving the lens unit to a predetermined stop position is defined based on operating properties of the actuators, which corresponds to use environmental conditions of the digital camera. The digital camera 100 includes an operation amount obtaining section (for example, a CPU 13 or the like) for obtaining the operation amount of the actuators from the stop position data stored in the ROM based on the operating properties of the actuators, which correspond to the specified use environmental conditions. The digital camera 100 includes a controlling section (for example, the CPU 13 or the like) for controlling operations of the actuators so that the actuators moves the lens unit to the predetermined stop position in accordance with the obtained operation amount of the actuators.

10 Claims, 4 Drawing Sheets

U.S. PATENT DOCUMENTS

| | | | | |
|---|---|---|---|---|
| 6,144,805 A | * | 11/2000 | Ogino | 396/81 |
| 6,285,831 B1 | * | 9/2001 | Hara | 396/50 |
| 6,618,212 B2 | * | 9/2003 | Chikami et al. | 359/699 |
| 6,646,816 B2 | * | 11/2003 | Hagimori | 359/705 |
| 6,710,950 B2 | * | 3/2004 | Rouvinen et al. | 359/824 |
| 6,812,965 B1 | * | 11/2004 | Kijima et al. | 348/362 |
| 6,865,009 B2 | * | 3/2005 | Nishioka | 359/295 |
| 7,102,270 B2 | * | 9/2006 | Ito et al. | 348/552 |
| 2003/0184669 A1 | * | 10/2003 | Nishioka et al. | 348/335 |
| 2005/0036775 A1 | * | 2/2005 | Morimoto | 396/67 |
| 2008/0152334 A1 | * | 6/2008 | Choi et al. | 348/335 |

FOREIGN PATENT DOCUMENTS

| | | | |
|---|---|---|---|
| JP | 11-264927 | | 9/1999 |
| JP | 2000019376 A | * | 1/2000 |
| JP | 2000-56208 | | 2/2000 |
| JP | 2002027304 A | * | 1/2002 |
| JP | 2002-130114 A | | 5/2002 |
| JP | 2002-228816 A | | 8/2002 |
| JP | 2003-66312 A | | 3/2003 |
| JP | 2003-195148 A | | 7/2003 |
| JP | 2003232986 A | * | 8/2003 |

* cited by examiner

FIG.3

| STOP POSITION | OPERATION AMOUNT OF ACTUATOR |
|---|---|
| ... | ... |
| ... | ... |
| ⋮ | ⋮ |
| ... | ... |

FIG.4

| TEMPERATURE | CORRECTION COEFFICIENT |
|---|---|
| ... | ... |
| ... | ... |
| ⋮ | ⋮ |
| ... | ... |

FIG.5

| IMAGE PICKUP ATTITUDE | CORRECTION COEFFICIENT |
|---|---|
| ... | ... |
| ... | ... |
| ⋮ | ⋮ |
| ... | ... |

FIG.6

| MOVING DIRECTION | CORRECTION COEFFICIENT |
|---|---|
| ... | ... |
| ... | ... |

| HUMIDITY | CORRECTION COEFFICIENT |
|---|---|
| ... | ... |
| ... | ... |
| ⋮ | ⋮ |
| ... | ... |

| IMAGE PICKUP DISTANCE | STOP POSITION |
|---|---|
| ... | ... |
| ... | ... |
| ⋮ | ⋮ |
| ... | ... |

12j

IMAGE DEVICE WITH LENS ADJUSTMENT FOR VARIOUS ENVIRONMENTAL CONDITIONS

RELATED APPLICATION

This is a U.S. National Phase Application under 35 USC 371 of International Application PCT/JP2004/011764, filed on 17 Aug. 2004.

TECHNICAL FIELD

The present invention relates to an image pickup device including an actuator which deforms by being supplied with electric power to move an image pickup member.

BACKGROUND ART

Heretofore, with regard to an image pickup device such as a camera, there have been many ones which use motors for driving image pickup lenses, and each of the image pickup devices is configured to adjust a position of the lens by using a phototransistor for use in detecting the number of pulses inputted to the motor and the position of the lens, and the like.

Incidentally, in recent years, miniaturization of the image pickup device has been significantly taking place, and moreover, a portable terminal which mounts an image pickup unit therein has also been developed; however, in these, it has been difficult to ensure spaces each for mounting the motor for auto focus and zoom functions therein.

Accordingly, there has been proposed a camera including piezoelectric ceramics which are displaced by being applied with a voltage, thereby directly driving the image pickup lens in an optical axis direction (for example, refer to Patent Document 1).

Moreover, there has also been known a camera including a drive device having a shape-memory alloy which deforms by being energized, thereby directly driving the image pickup lens (for example, refer to Patent Document 2).

Patent Document 1: JP-Tokukaihei-11-264927A
Patent Document 2: JP-Tokukai-2000-56208A

DISCLOSURE OF THE INVENTION

Problems to be Solved by the Invention

However, in each of the cases of the above-described Patent Document 1 and Patent Document 2, there is such a problem that, for example, a position detection sensor or the like must be used for position adjustment of the image pickup lens which moves in response to an operation of an actuator such as the piezoelectric ceramics and the shape-memory alloy, thus making it impossible to sufficiently achieve the miniaturization of the image pickup device.

Moreover, in the case of not using the position detection sensor, configurations are adopted, in each of which a stop position of the lens is calculated by an arithmetic operation by means of a central processing unit or the like, and for example, a voltage or an amount of electric current is changed in response to the stop position, thereby performing the position adjustment of the image pickup lens. However, these are not made considering a change of an operation amount of the actuator owing to a change of use environmental conditions such as temperature and an attitude of the image pickup device in the case of the image pickup. Accordingly, it has been difficult to appropriately perform the position adjustment of the image pickup lens.

Furthermore, in a camera using, for example, a CCD or the like as an image pickup element, a configuration is adopted, in which auto-focusing is performed by using an actual image signal; however, in the case where the stop position of the image pickup lens has been changed owing to the use environmental conditions, a focus point must be calculated by scanning points in a wide range of the image, and it has been impossible to perform an operation therefor in a short time.

It is an object of the present invention to provide an image pickup device capable of achieving miniaturization thereof, and of performing position adjustment of an image pickup member at high speed and as appropriate.

Means for Solving the Problem

In order to achieve the above-described object, the present invention is an image pickup device comprises:

a movable image pickup member which configures an image pickup section for performing an image pickup of a subject, an actuator which deforms by being supplied with electric power to move the image pickup member and in which operating property for the supply of the electric power are varied in response to use environmental conditions of the image pickup device, and a controlling section for controlling an operation of the actuator, a storing section for storing stop position information in which an operation amount of the actuator for moving the image pickup member to a predetermined stop position is defined based on the operating property of the actuator, which corresponds to at least one of the use environmental conditions of the image pickup device;

a use environmental condition specifying section for specifying the use environmental conditions of the image pickup device; and an operation amount obtaining section for obtaining the operation amount of the actuator from the stop position information stored in the storing section based on the operating property of the actuator, which corresponds to the use environmental conditions specified by the use environmental condition specifying section, wherein the controlling section controls an operation of the actuator so that the actuator moves the image pickup member to the predetermined stop position in accordance with the operation amount of the actuator, which is obtained by the operation amount obtaining section.

Here, for example, piezoelectric ceramics, a shape-memory alloy, and the like are mentioned as the actuator. Moreover, the deformation of the actuator is, for example, one accompanied with a change of thickness in the piezoelectric ceramics, and one in which a bending occurs and a length is changed in the shape-memory alloy.

Moreover, as the image pickup member, for example, an image pickup lens which forms an optical image of the subject, an image pickup element which performs photoelectric conversion for the optical image formed by the image pickup lens, and the like are mentioned.

Furthermore, as the use environmental conditions, for example, temperature, humidity, an attitude of the image pickup device in the case of the image pickup, a moving direction of the image pickup member, and the like are mentioned.

According to this invention, the use environmental conditions of the image pickup device can be specified, the operation amount of the actuator can be obtained from the stop position information based on the operating property of the actuator, which corresponds to the specified use environmental conditions, and the actuator can be operated so as to move the image pickup member to the predetermined stop position in accordance with the obtained operation amount of the actuator. Specifically, the stop position information in which the operation amount of the actuator for moving the image pickup member to the predetermined stop position is defined based on the operating property of the actuator, which corresponds to at least one of the use environmental conditions of the image pickup device, is stored. Accordingly, the operation amount of the actuator can be obtained rapidly in accordance with the stop position information. Furthermore, the obtained operation amount of the actuator is one considering the change of the operating property of the actuator, which corresponds to the use environmental conditions, and accordingly, the image pickup member is moved in accordance with the operation amount of the actuator, thus making it possible to perform the position adjustment of the image pickup member at high speed and as appropriate.

Moreover, since the image pickup member is moved by the actuator, the miniaturization of the image pickup device can be achieved, for example, in comparison with the case of moving the image pickup member by a motor, and the movement of the image pickup member at high speed can be realized without causing a backlash.

Moreover, it is preferable that the stop position information comprises temperature operation amount information in which the operation amount of the actuator is defined based on the operating property of the actuator, which is varied in response to the use environmental conditions including temperature, the use environmental condition specifying section comprises a temperature detecting section for detecting the temperature, and the operation amount obtaining section obtains the operation amount of the actuator, which corresponds to the operating property of the actuator at the temperature detected by the temperature detecting section, from the temperature operation amount information of the stop position information.

According to this invention, the operation amount of the actuator, which corresponds to the operating property of the actuator at the detected temperature, can be obtained from the temperature operation amount information included in the stop position information. Hence, the position adjustment of the image pickup member can be performed appropriately in accordance with the operation amount of the actuator in consideration of the operating property of the actuator, which is varied in response to the change of the temperature as the use environmental conditions.

Furthermore, it is preferable that the stop position information comprises attitude operation amount information in which the operation amount of the actuator is defined based on the operating property of the actuator, which is varied in response to the use environmental conditions including an attitude of the image pickup section, the use environmental condition specifying section comprises an attitude specifying section for specifying the attitude of the image pickup section in a case of the image pickup of the subject, and the operation amount obtaining section obtains the operation amount of the actuator, which corresponds to the operating property of the actuator in the attitude of the image pickup section, the attitude being specified by the attitude specifying section, from the attitude operation amount information of the stop position information.

According to this invention, the operation amount of the actuator, which corresponds to the operating property of the actuator in the specified attitude of the image pickup section in the case of imaging the object, can be obtained from the attitude operation amount information included in the stop position information. Hence, the position adjustment of the image pickup member can be performed appropriately in accordance with the operation amount of the actuator in consideration of the operating property of the actuator, which is varied in response to the attitude change of the image pickup section, as the use environmental conditions.

Moreover, it is preferable that the stop position information comprises direction operation amount information in which the operation amount of the actuator is defined based on the operating property of the actuator, which is varied in response to the use environmental conditions including a moving direction of the image pickup member which is moved by the actuator, the use environmental condition specifying section comprises a moving direction specifying section for specifying the moving direction of the image pickup member which is moved by the actuator, and the operation amount obtaining section obtains the operation amount of the actuator, which corresponds to the operating property of the actuator in the moving direction of the image pickup member, the moving direction being specified by the moving direction specifying section, from the moving operation amount information of the stop position information.

According to this invention, the operation amount of the actuator, which corresponds to the operating property of the actuator in the specified moving direction of the image pickup section, can be obtained from the direction operation amount information included in the stop position information. Hence, the position adjustment of the image pickup member can be performed appropriately in accordance with the operation amount of the actuator in consideration of the operating property of the actuator, which is varied in response to the moving direction of the image pickup member, for example, in the case of zooming-in, zooming-out, or the like, as the use environmental conditions.

Moreover, it is preferable that the stop position information comprises humidity operation amount information in which the operation amount of the actuator is defined based on the operating property of the actuator, which is varied in response to the use environmental conditions including humidity, the use environmental condition specifying section comprises a humidity detecting section for detecting the humidity, and the operation amount obtaining section obtains the operation amount of the actuator, which corresponds to the operating property of the actuator at the humidity detected by the humidity detecting section, from the humidity operation amount information of the stop position information.

According to this invention, the operation amount of the actuator, which corresponds to the operating property of the actuator at the detected humidity, can be obtained from the humidity operation amount information included in the stop position information. Hence, the position adjustment of the image pickup member can be performed appropriately in accordance with the operation amount of the actuator in consideration of the operating property of the actuator, which is varied in response to the change of the humidity, as the use environmental conditions.

Moreover, it is preferable that the storing section stores distance information relating to an image pickup distance from the image pickup section to the subject in association with the stop position of the image pickup member, the image pickup device further comprises:

a distance measuring section for measuring the image pickup distance; and a stop position specifying section for specifying the stop position of the image pickup member from the distance information stored in the storing section, the distance information corresponding to the image pickup distance, based on the image pickup distance measured by the distance measuring section, and wherein the operation amount obtaining section obtains the operation amount of the actuator, which corresponds to the stop position specified by the stop position specifying section, from the stop position information stored in the storing section.

According to this invention, the stop position of the image pickup member can be specified from the distance information based on the measured image pickup distance from the image pickup section to the subject. Accordingly, the stop position of the image pickup member can be specified rapidly in comparison with, for example, the case of calculating the stop position by performing an arithmetic operation by means of a predetermined arithmetic operation circuit. Furthermore, the operation amount of the actuator, which corresponds to the specified stop position, can be obtained rapidly from the stop position information, thus making it possible to contribute to enhancement of the speed of the position adjustment of the image pickup member.

Moreover, it is preferable that at least two of the actuators are provided, the first actuator is configured to be capable of an operation control with high precision, and the second actuator is configured to have an operating range wider than the first actuator.

According to this invention, between the at least two of the provided actuators, the first actuator is configured to be capable of the operation control with high precision, and the second actuator is configured to have the operating range wider than the first actuator. Accordingly, the image pickup member is moved by combining these two actuators, thus making it possible to perform the position adjustment of the image pickup member at high speed and with high precision, that is, with more rationality.

Effect of the Invention

According to the present invention, the stop position information in which the operation amount of the actuator for moving the image pickup member to the predetermined stop position is defined based on the operating property of the actuator, which corresponds to at least one of the use environmental conditions of the image pickup device, is stored. Accordingly, the operation amount of the actuator can be obtained rapidly in accordance with the stop position information. Furthermore, the obtained operation amount of the actuator is one considering the change of the operating property of the actuator, which corresponds to the use environmental conditions, and accordingly, the image pickup member is moved in accordance with the operation amount of the actuator, thus making it possible to perform the position adjustment of the image pickup member at high speed and as appropriate. Moreover, miniaturization of the image pickup device can be achieved, for example, in comparison with the case of moving the image pickup member by a motor, and the movement of the image pickup member at high speed can be realized without causing a backlash.

BRIEF DESCRIPTION OF THE DRAWINGS

[FIG. 3] A view schematically showing a stop position operation amount table according to stop position adjustment processing by the digital camera of FIG. 1.

[FIG. 4] A view schematically showing a temperature correction table according to the stop position adjustment processing by the digital camera of FIG. 1.

[FIG. 5] A view schematically showing an attitude correction table according to the stop position adjustment processing by the digital camera of FIG. 1.

[FIG. 6] A view schematically showing a direction correction table according to the stop position adjustment processing by the digital camera of FIG. 1.

[FIG. 7] A view schematically showing a humidity correction table according to the stop position adjustment processing by the digital camera of FIG. 1.

[FIG. 8] A view schematically showing a stop position distance table according to the stop position adjustment processing by the digital camera of FIG. 1.

BEST MODE FOR CARRYING OUT THE INVENTION

Figure 1:
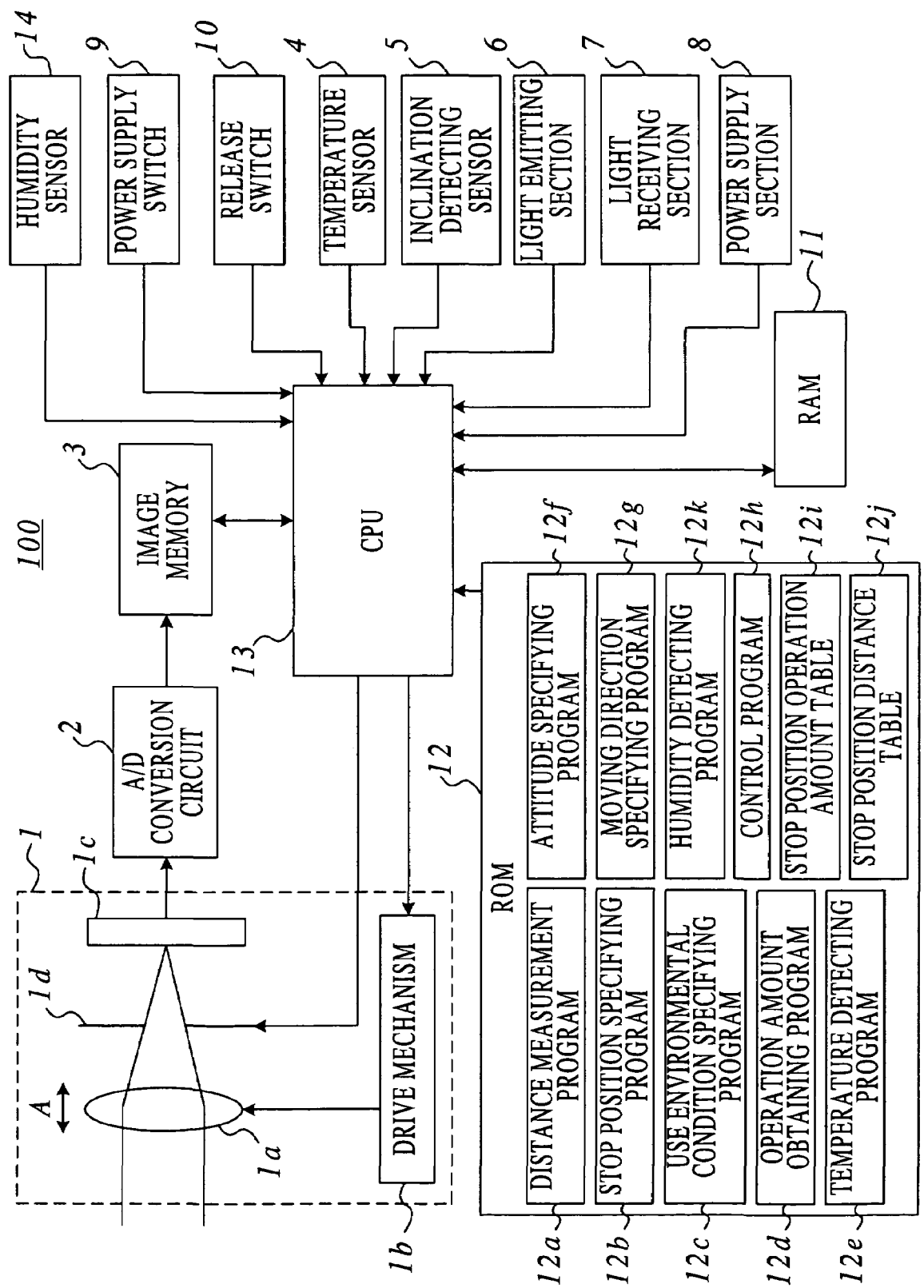
[FIG. 1] A block diagram showing a configuration of main portions of a digital camera illustrated as an embodiment of an image pickup device to which the present invention is applied.

A description is made below of a specific aspect of the present invention by using the drawings. However, the scope of the invention is not limited to an example shown in the drawings.

FIG. 1 is a block diagram showing a configuration of main portions of a digital camera illustrated as an embodiment of an image pickup device to which the present invention is applied.

As shown in FIG. 1, a digital camera 100 is configured by including an image pickup section 1, an A/D conversion circuit 2, an image memory 3, a temperature sensor 4, a humidity sensor 14, an inclination detecting sensor 5, a light emitting section 6, a light receiving section 7, a power supply section 8, a power supply switch 9, a release switch 10, a RAM 11, a ROM 12, a CPU 13, and the like.

The image pickup section 1 includes a lens unit (an image pickup member) 1a having, for example, a plurality of image pickup lenses (not shown) which form an optical image of a subject (not shown) on an optical path, a drive mechanism 1b which moves the lens unit 1a in an optical axis direction A for the purpose of focus position adjustment of the lens unit 1a, an image pickup element 1c, for example, such as a charge coupled device (CCD), which performs a photoelectric conversion for the optical image formed by the lens unit 1a, and outputs, to the A/D conversion circuit 2, an image signal (an analog signal) obtained by performing the photoelectric conversion for the optical image, and a diaphragm unit 1d which adjusts a quantity of light incident onto the image pickup element 1c in such a manner that an aperture amount thereof is controlled by the CPU 13.

Figure 2:
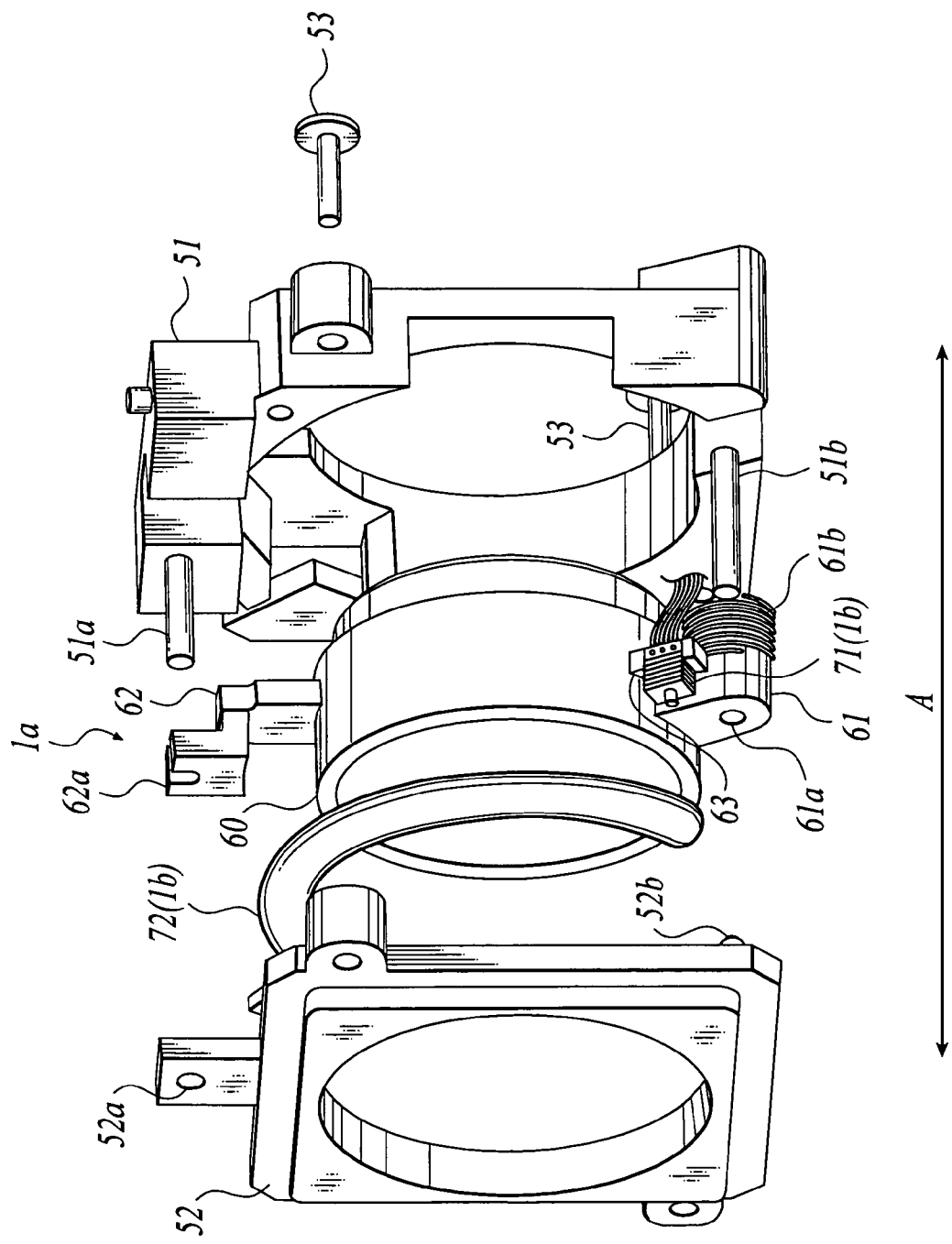
[FIG. 2] An exploded perspective view showing an image pickup section provided in the digital camera of FIG. 1.

Here, a description is made in more detail of the lens unit 1a and the drive mechanism 1b with reference to FIG. 2.

Note that, though FIG. 2 is an exploded perspective view showing the image pickup section 1, illustration of the image pickup element 1c and the diaphragm unit 1d is omitted.

As shown in FIG. 2, a front frame member 51 is provided on a subject's side of the lens unit 1a and the drive mechanism 1b, a rear frame member 52 is provided on other side thereof to the subject, and the front frame member 51 and the rear frame member 52 are fastened to each other by fastening members 53 and 53. In such a way, the lens unit 1a, the drive mechanism 1b, the front frame member 51, the rear frame member 52, and the fastening members 53 are configured integrally.

On the front frame member 51, a first shaft 51a and a second shaft 51b which are extended substantially parallel to the optical axis direction A are provided. On the rear frame member 52, a first shaft receiving portion 52a and a second shaft receiving portion 52b which receive the first shaft 51a and the second shaft 51b are provided.

The lens unit 1a includes therein a holding member 60 which holds the plurality of image pickup lenses, and on an outer circumferential surface of the holding member 60, a first guide portion 61 and a second guide portion 62 which guide a movement of the lens unit 1a in the optical axis direction A are provided.

In the first guide portion 61, an insertion hole 61a into which the first shaft 51a is inserted is provided, and a spring 61b which urges the lens unit 1a to the opposite side to the subject in the optical axis direction A is attached thereto. On the second guide portion 62, a shaft receiving portion 62a for receiving the second shaft 51b is formed.

Hence, the lens unit 1a with the above-described configuration can be set in a freely movable state in the optical axis direction A in such a manner that the front frame member 51 and the rear frame member 52 are fastened to each other so that the first shaft 51a can be inserted into the insertion hole 61a and that the second shaft 51b can be received by the shaft receiving portion 62a.

Moreover, on the holding member 60, a fixing portion 63 for fixing a first actuator 71 (to be described later) configuring the drive mechanism 1b is provided adjacent to the first guide portion 61.

The drive mechanism 1b is one which operates and deforms by being supplied with electric power from the power supply section 8 under a control from the CPU 13, thereby moving the lens unit 1a in the optical axis direction A, and includes the first actuator 71 and a second actuator 72.

The first actuator 71 is, for example, a stacked-type piezoelectric ceramics in which piezoelectric elements are stacked in the optical axis direction A, and is configured to be capable of an operation control with higher precision than that of the second actuator 72 under the control of the CPU 13. Moreover, the first actuator 71 is provided so that an end thereof on the subject's side in the optical axis direction A can be fixed to the fixing portion 63, and that an end thereof on the opposite side to the subject can be capable of abutting on one end of the second actuator 72.

Then, the first actuator 71 is displaced in response to a pulse voltage inputted thereto so as to move, in the optical axis direction A, a position of the end thereof on the opposite side to the subject, thereby pressing the one end of the second actuator 72. In such a way, the first actuator 71 is set capable of moving the lens unit 1a to the subject's side in the optical axis direction A with respect to the second actuator 72.

The second actuator 72 is substantially semicircular piezoelectric ceramics provided between the lens unit 1a and the rear frame member 52, and is configured so that an operating range thereof can be widened than that of the first actuator 71 under the control of the CPU 13. Moreover, the second actuator 72 is provided so that the one end thereof can be capable of abutting on the first actuator 71 fixed to the fixing portion 63 and that the other end thereof can be capable of abutting on the rear frame member 52.

Then, the second actuator 72 is displaced in response to a pulse voltage inputted thereto so that a position of the other end in the optical axis direction A with respect to the one end can be varied, thereby being set capable of moving the lens unit 1a in the optical axis direction A. Specifically, the second actuator 72 is displaced so that both of the ends can be apart from each other, thereby being set capable of moving the lens unit 1a to the subject's side. Meanwhile, the second actuator 72 is displaced so that both of the ends can approach each other, and the lens unit 1a always urged by the spring 61b to the opposite side to the subject in the optical axis direction A is thus set movable to the opposite side to the subject.

The first actuator 71 and the second actuator 72 which have the above-described configurations may be configured so that either one thereof can operate or both thereof can operate in response to an amount of moving the lens unit 1a in the optical axis direction A under the control of the CPU 13.

The A/D conversion circuit 2 converts, into a digital signal, the analog signal inputted thereto, which is outputted from the image pickup element 1c, and outputs, to the image memory 3, the digital image signal thus converted.

The image memory 3 temporarily stores the digital image signal inputted thereto through the A/D conversion circuit 2.

The temperature sensor 4 senses temperature in an inside of the digital camera 100, and outputs a temperature detecting signal to the CPU 13. Moreover, it is preferable that the temperature sensor 4 be disposed in the vicinity of the drive mechanism 1b in which operating property is varied owing to a change of the temperature, or in contact with the drive mechanism 1b.

The humidity sensor 14 senses humidity in the inside of the digital camera 100, and outputs a humidity detecting signal to the CPU 13. Moreover, it is preferable that the humidity sensor 14 be disposed in the vicinity of the drive mechanism 1b in which the operating property is varied owing to the change of the humidity, or in contact with the drive mechanism 1b.

The inclination detecting sensor 5 senses a degree of inclination in a horizontal direction perpendicular to a vertical direction of the digital camera 100, and outputs an inclination detecting signal to the CPU 13.

Here, anything is applicable to the above-described temperature sensor 4, humidity sensor 14, and inclination detecting sensor 5.

The light emitting section 6 is, for example, an infrared LED or the like, and is one which emits light by being driven by a drive circuit (not shown) under the control of the CPU 13.

The light receiving section 7 is, for example, a photodiode or the like, receives light emitted by the light emitting section 6 and reflected on the subject, and outputs a light detecting signal to the CPU 13 through an amplifier circuit (not shown).

Though not shown, the power supply section 8 includes a power supply such as a repeatedly usable secondary battery, and a power supply circuit which receives a voltage outputted from the power supply, converts the voltage into a rated voltage necessary in each section configuring the digital camera 100, and supplies the rated voltage to each section.

The power supply switch 9 is operated by a user, connects an output stage of the power supply to an input stage of the power supply circuit by an ON operation of the power supply, and opens the connection between the output stage of the power supply and the input stage of the power supply circuit by an OFF operation of the power supply.

The release switch 10 outputs an instruction signal, which instructs the CPU 13 to start an imaging operation, based on an operation of the user.

The random access memory (RAM) 11 is, for example, a volatile semiconductor memory, and has a work area where a program, data, and the like which are being processed by the CPU 13 are temporarily stored.

The read only memory (ROM) 12 is a memory dedicated to read data and the like therefrom, and stores application programs relating to a variety of processing as the digital camera 100, which is executed by the CPU 13, data for use in a variety of operations, and the like. Specifically, the ROM 12 stores a distance measurement program 12a, a stop position specifying program 12b, a use environmental condition specifying program 12c, an operation amount obtaining program 12d, a temperature detecting program 12e, an attitude specifying program 12f, a moving direction specifying program 12g, a humidity detecting program 12k, a control program 12h, and the like.

Moreover, the ROM 12 configures storing means which stores a stop position operation amount table (stop position information: refer to FIG. 3) 12i in which operation amount of the first actuator 71 and the second actuator 72 for moving the lens unit 1a to a predetermined stop position based on operating properties of the first actuator 71 and the second actuator 72, which correspond to at least one of the use environmental conditions of the digital camera 100, are defined.

The stop position operation amount table 12i is configured by including, for example, temperature operation amount information defined based on operating properties of the first actuator 71 and the second actuator 72, in which the operation amount of the first and second actuators 71 and 72 are varied in response to the use environmental conditions including the temperature, humidity operation amount information defined based on operating properties of the first actuator 71 and the second actuator 72, which are varied in response to the use environmental conditions including the humidity, attitude operation amount information defined based on operating properties of the first actuator 71 and the second actuator 72, which are varied in response to the use environmental conditions including the attitude of the image pickup section 1, direction operation amount information defined based on operating properties of the first actuator 71 and the second actuator 72, which are varied in response to the use environmental conditions including the moving direction of the lens unit 1a, the moving being performed by the operations of the first actuator 71 and the second actuator 72, and the like.

Here, specifically, the temperature operation amount information has, for example as shown in FIG. 4, a temperature correction table T1 in which the temperatures and correction coefficients for the operation amount of the actuators at the temperatures are associated with each other. The humidity operation amount information has, for example as shown in FIG. 7, a humidity correction table T4 in which the humidities and correction coefficients for the operation amount of the actuators at the humidities are associated with each other. The attitude operation amount information has, for example as shown in FIG. 5, an attitude correction table T2 in which the image pickup attitudes and correction coefficients for the operation amount of the actuators, which correspond to the attitudes, are associated with each other. The direction operation amount information has, for example as shown in FIG. 6, a direction correction table T3 in which the moving directions of the lens unit 1a and correction coefficients for the operation amount of the actuators, which correspond to the moving directions, are associated with each other.

Note that, in the attitude operation amount information, in some cases, the attitude of the image pickup section 1 is varied, for example, owing to mass variations caused by manufacturing errors of the parts configuring the image pickup section 1. Accordingly, the attitude of the image pickup section 1 may be one in which the operation amount is defined based on the operating properties of the first actuator 71 and the second actuator 72, which are varied by the masses of the parts. In such a way, the position adjustment of the lens unit 1a in the optical axis direction A can be performed more appropriately based on the attitude operation amount information considering the variations of the masses of the parts.

Moreover, the ROM 12 stores a stop position distance table (distance information: refer to FIG. 7) 12j in which the stop positions of the lens unit 1a in the optical axis direction A and image pickup distances from the image pickup section 1 to the subject are associated with each other.

The central processing unit (CPU) 13 reads out the variety of application programs relating to a variety of functions as the digital camera 100, which are stored in the ROM 12, expands the application programs in the work area in the RAM 11, and executes the variety of processing and the like in accordance with the programs.

Specifically, the CPU 13 performs stop position adjustment processing for adjusting the stop position (the focus position) of the lens unit 1a moved in the optical axis direction A, for example, in the case of auto-focusing (AF), zooming, or the like.

In this stop position adjustment processing, the CPU 13 measures the image pickup distance from the image pickup section 1 to the subject in accordance with the distance measurement program 12a based on the light detecting signal outputted from the amplifier circuit by receiving, on the light receiving section 7, the light emitted from the light emitting section 6 and reflected on the subject. Here, the CPU 13 configures distance measuring means together with the light emitting section 6 and the light receiving section 7.

Moreover, as stop position specifying means, the CPU 13 specifies the stop position of the lens unit 1a in the optical axis direction A from the stop position distance table 12j stored in the ROM 12, which corresponds to the image pickup distance, in accordance with the stop position specifying program 12b based on the measured image pickup distance.

Furthermore, as use environmental condition specifying means, the CPU 13 specifies the use environmental conditions of the digital camera 100 in accordance with the use environmental condition specifying program 12c.

Specifically, the CPU 13 senses the temperature in the inside of the digital camera 100 in accordance with the temperature detecting program 12e based on the temperature detecting signal outputted from the temperature sensor 4. Here, the CPU 13 configures temperature detecting means together with the temperature sensor 4.

Moreover, the CPU 13 senses the humidity in the inside of the digital camera 100 in accordance with the humidity detecting program 12k based on the humidity detecting signal outputted from the humidity sensor 14. Here, the CPU 13 configures the humidity detecting section together with the humidity sensor 14.

Furthermore, the CPU 13 specifies the attitude of the image pickup section 1 in the case of imaging the subject, that is, the degree of inclination of the digital camera 100 in accordance with the attitude specifying program 12f based on the inclination detecting signal outputted from the inclination detecting sensor 5. Here, the CPU 13 configures the attitude specifying section together with the inclination detecting sensor 5.

Moreover, as the moving direction specifying section, the CPU 13 specifies the moving direction of the lens unit 1a, the moving being performed by the first actuator 71 and the second actuator 72, in accordance with the moving direction specifying program 12g based on an output signal for the power supply section 8, which relates to an operation control of the first actuator 71 and the second actuator 72.

Moreover, as the operation amount obtaining section, the CPU 13 reads out and obtains the operation amount of the first actuator 71 and the second actuator 72 from the stop position operation amount table 12i stored in the ROM 12 in accordance with the operation amount obtaining program 12d based on the operating properties of the first actuator 71 and the second actuator 72, which correspond to the specified use environmental conditions of the digital camera 100, and on the specified stop position of the lens unit 1a.

Specifically, based on the temperature operation amount information of the stop position operation amount table 12i, the CPU 13 obtains the operation amount of the first actuator 71 is the second actuator 72, which are corrected in response to the operating properties of the first actuator 71 and the second actuator 72 at the detected temperature.

Moreover, based on the humidity operation amount information of the stop position operation amount table 12i, the CPU 13 obtains the operation amount of the first actuator 71 and the second actuator 72, which is corrected in response to the operating properties of the first actuator 71 and the second actuator 72 at the detected humidity.

Furthermore, based on the attitude operation amount information of the stop position operation amount table 12i, the CPU 13 obtains the operation amount of the first actuator 71 and the second actuator 72, which is corrected in response to the operating properties of the first actuator 71 and the second actuator 72 in the specified attitude of the image pickup section 1.

Moreover, based on the direction operation amount information of the stop position operation amount table 12i, the CPU 13 obtains the operation amount of the first actuator 71 and the second actuator 72, which is corrected in response to the operating properties of the first actuator 71 and the second actuator 72 in the specified moving direction of the lens unit 1a.

Moreover, as the controlling section, the CPU 13 controls the operations of the first actuator 71 and the second actuator 72 so that the first and second actuators 71 and 72 can move the lens unit 1a to the stop position thereof in accordance with the control program 12h in response to the obtained operation amount of the first actuator 71 and the second actuator 72.

Next, the stop position adjustment processing for the lens unit 1a under the control of the CPU 13, is described.

The stop position adjustment processing is processing executed in such a manner that the instruction signal relating to the adjustment of the focus position of the lens unit 1a, such as in the AF and zoom functions, is inputted to the CPU 13 based on a predetermined operation of the user in the case of the image pickup of the subject by the digital camera 100.

In the stop position adjustment processing, first, the CPU 13 reads out the distance measurement program 12a from the ROM 12, and expands the distance measurement program 12a in the RAM 11. Then, the CPU 13 measures the image pickup distance from the image pickup section 1 to the subject in accordance with the distance measurement program 12a based on the light detecting signal outputted from the amplifier circuit in such a manner that the light is emitted by the light emitting section 6 and that the light reflected on the subject is received by the light receiving section 7.

Then, the CPU 13 reads out the stop position specifying program 12b from the ROM 12, and expands the stop position specifying program 12b in the RAM 11. Then, the CPU 13 specifies the stop position of the lens unit 1a in the optical axis direction A from the stop position distance table 12j stored in the ROM 12, which corresponds to the measured image pickup distance, in accordance with the stop position program 12b based on the measured image pickup distance.

Next, the CPU 13 reads out the use environmental condition specifying program 12c from the ROM 12, and expands the use environmental condition specifying program 12c in the RAM 11. Then, the CPU 13 specifies the use environmental conditions of the digital camera 100 in accordance with the use environmental condition specifying program 12c. Specifically, the CPU 13 executes the processing for detecting the temperature in the inside of the digital camera 100, and in particular, of the disposed position of the drive mechanism 1b in accordance with the temperature detecting program 12e read out from the ROM 12 and expanded in the RAM 11, the processing for detecting the humidity in the inside of the digital camera 100, and in particular, of the disposed position of the drive mechanism 1b in accordance with the humidity detecting program 12k read out from the ROM 12 and expanded in the RAM 11, the processing for specifying the degree of inclination of the digital camera 100 in the horizontal direction in the case of the imaging thereby in accordance with the attitude specifying program 12f read out from the ROM 12 and expanded in the RAM 11, and the processing for specifying the moving direction of the lens unit 1a in accordance with the moving direction specifying program 12g read out from the ROM 12 and expanded in the RAM 11.

Subsequently, the CPU 13 reads out the operation amount obtaining program 12d, and expands the operation amount obtaining program 12d in the RAM 11. Then, in accordance with the operation amount obtaining program 12d, the CPU 13 reads out and obtains the information relating to the operation amount of the first actuator 71 and the second actuator 72 from the stop position operation amount table 12i based on the operating properties of the first actuator 71 and the second actuator 72, which correspond to the above-specified use environmental conditions of the digital camera 100, and on the stop position of the lens unit 1a, which is specified from the stop position distance table 12j. Specifically, the CPU 13 executes the processing for correcting and obtaining the operation amount of the first actuator 71 and the second actuator 72 in the stop position operation amount table 12i by the temperature correction table T1 in response to the temperature detected based on the temperature operation amount information, the processing for correcting and obtaining the operation amount of the first actuator 71 and the second actuator 72 in the stop position operation amount table 12i by the humidity correction table T4 in response to the humidity detected based on the humidity operation amount information, the processing for correcting and obtaining the operation amount of the first actuator 71 and the second actuator 72 in the stop position operation amount table 12i by the attitude correction table T2 in response to the degree of inclination of the image pickup section 1 in the horizontal direction, which is specified based on the attitude operation amount information, the processing for correcting and obtaining the operation amount of the first actuator 71 and the second actuator 72 in the stop position operation amount table 12i by the direction correction table T3 in response to the moving direction of the lens unit 1a, which is specified based on the direction operation amount information, and the like.

Next, the CPU 13 reads out the control program 12h from the ROM 12, and expands the control program 12h in the RAM 11. Then, in accordance with the control program 12h, the CPU 13 controls the operations of the first actuator 71 and the second actuator 72 in response to the operation quantities of the first actuator 71 and the second actuator 72, which consider the operating properties varied owing to the above-obtained use environmental conditions, and then moves the lens unit 1a to the focus position.

As described above, according to the digital camera 100, the operation amount of the first actuator 71 and the second actuator 72 are obtained from data of the stop position based on the operating properties of the actuators 71 and 72, which correspond to the specified use environmental conditions of the digital camera 100, and the actuators 71 and 72 can be operated so as to move the lens unit 1a to the predetermined stop position in accordance with the obtained operation amount of the actuators 71 and 72.

Specifically, the stop position operation amount table 12i is stored, which includes the temperature operation amount information, the humidity operation amount information, the attitude operation amount information, and the direction operation amount information, in which the operation amount of the actuators 71 and 72 for moving the lens unit 1a to the predetermined stop position are defined based on the operating properties of the actuators 71 and 72, which correspond to the use environmental conditions such as the temperature and the humidity in the inside of the digital camera 100, the attitude of the image pickup section 1, and the moving direction of the lens unit 1a. Hence, in accordance with the stop position operation amount table 12i, the obtaining of the operation amount of the actuators 71 and 72 can be performed rapidly in consideration of the operating properties varied in response to the change of such internal temperature, the operating properties varied in response to the change of such internal humidity, the operating properties varied in response to the change of the attitude of the image pickup section 1 in the case of imaging the subject, the operating properties varied in response to the moving direction of the lens unit 1a, and the like. Moreover, the lens unit 1a is moved in accordance with the obtained operation amount of the actuators 71 and 72, thus making it possible to perform the position adjustment of the lens unit 1a at high speed and as appropriate.

Moreover, since the lens unit 1a is moved by the actuators 71 and 72, miniaturization of the digital camera 100 can be achieved, for example, in comparison with the case of moving the lens unit 1a by a motor, and the movement of the lens unit 1a at high speed can be realized, for example, without causing a backlash.

Furthermore, between the two actuators 71 and 72, the first actuator 71 is configured to be capable of the operation control with high precision, and the second actuator 72 is configured to have the operating range wider than the first actuator 71. Accordingly, the lens unit 1a is moved by combining these two actuators 71 and 72, thus making it possible to perform the position adjustment of the lens unit 1a at high speed and with high precision, that is, with more rationality.

Moreover, the stop position of the lens unit 1a can be specified from the stop position distance table 12j based on the image pickup distance from the image pickup section 1 to the subject, which is measured by the light emitting section 6, the light receiving section 7, and the CPU 13. Accordingly, the stop position of the lens unit 1a can be specified rapidly, for example, in comparison with the case of calculating the stop position by performing an arithmetic operation by means of a predetermined arithmetic operation circuit. Furthermore, the operation amount of the actuators 71 and 72, which correspond to the specified stop position, can be obtained rapidly from the stop position operation amount table 12i, thus making it possible to contribute to enhancement of the speed of the position adjustment of the lens unit 1a.

Note that the present invention is not limited to the above-described embodiment, and various improvements and design changes may be performed in the scope without departing from the gist of the present invention.

For example, the first actuator 71 and the second actuator 72 are not limited to the piezoelectric ceramics, and may be shape-memory alloys or the like which deform by self-heating by being energized, thereby moving the lens unit 1a in the optical axis direction A.

Moreover, in the above-described embodiment, such a configuration is adopted, in which the operation amount of the first actuator 71 and the second actuator 72 are obtained in consideration of the operating properties of the actuators 71 and 72, which correspond to the respective use environmental conditions such as the internal temperature, the internal humidity, the attitude of the image pickup section 1, and the moving direction of the lens unit 1a. However, it is not necessary that the operation amount of the actuators 71 and 72 be obtained based on the operating properties of the actuators 71 and 72, which correspond to all of the above-described use environmental conditions. Specifically, the operation amount of the actuators 71 and 72 may also be obtained based on any of the use environmental conditions, which are the internal temperature, the internal humidity, the attitude of the image pickup section 1, and the moving direction of the lens unit 1a.

Moreover, it is a matter of course that the use environmental conditions are not limited to the internal temperature, the internal humidity, the attitude of the image pickup section 1, the moving direction of the lens unit 1a, and the like.

In the above-described embodiment, such a configuration is adopted, in which the lens unit 1a is moved by the first actuator 71 and the second actuator 72; however, the present invention is not limited to this, and for example, such a configuration may also be adopted, in which the image pickup element 1c as the image pickup member is moved in the optical axis direction A.

Moreover, in the above-described embodiment, the distance measuring means is composed of the light emitting section 6, the light receiving section 7, the CPU 13, and the like; however, the present invention is not limited to this, and for example, such a configuration may also be adopted, in which the image pickup distance from the image pickup section 1 to the subject is measured by using the image signal obtained by performing, by the image pickup element 1c such as the CCD, the photoelectric conversion for the image formed by the lens unit 1a.

Note that it is a matter of course that the image pickup device is not limited to the digital camera 100 explained above, and may be one using a silver halide film.

INDUSTRIAL APPLICABILITY

As described above, the image pickup device according to the present invention is useful for performing the position adjustment of the image pickup member at high speed and as appropriate, and in particular, is suitable for the case of achieving the miniaturization of the image pickup device.

EXPLANATION OF REFERENCE NUMERALS 100 digital camera (image pickup device)
1 image pickup section
1a lens unit (image pickup member)
4 temperature sensor (temperature detecting section, use environmental condition specifying section)
5 inclination detecting sensor (attitude specifying section, use environmental condition specifying section)
6 light emitting section (distance measuring section, use environmental condition specifying section)
7 light receiving section (distance measuring section, use environment condition specifying section)
12 ROM (storing section)
13 CPU (controlling section, use environmental condition specifying section, operation amount obtaining section, temperature detecting section, humidity detecting section, attitude specifying section, moving direction specifying section, distance measuring section, stop position specifying section)
14 humidity sensor (humidity detecting section, use environmental condition specifying section)
71 first actuator
72 second actuator
12i stop position operation amount table (stop position information)
12j stop position distance table (distance information)

The invention claimed is:

1. An image pickup device, comprising:
a movable image pickup member which configures an image pickup section for performing an image pickup of a subject;
an actuator which deforms by being supplied with electric power to move the image pickup member and in which an operating property for the supply of the electric power is varied in response to use environmental conditions of the image pickup device; and
a controlling section for controlling an operation of the actuator;
a storing section for storing stop position information comprising attitude operation amount information in which an operation amount of the actuator for moving the image pickup member to a predetermined stop position is defined based on an operating property of the actuator, which corresponds to at least one of the use environmental conditions of the image pickup device;
a use environmental condition specifying section for specifying the at least one of the use environmental conditions of the image pickup device, the use environmental condition specifying section comprising an attitude specifying section for specifying an attitude of the image pickup section in a case of the image pickup of the subject; and
an operation amount obtaining section for obtaining the operation amount of the actuator from the stop position information stored in the storing section based on the operating property of the actuator, the operating property of the actuator corresponding to the at least one of the use environmental conditions specified by the use environmental condition specifying section, the operation amount of the actuator corresponding to the operating property of the actuator in the attitude of the image pickup section, the attitude being specified by the attitude specifying section, from the attitude operation amount information of the stop position information;
wherein the controlling section controls an operation of the actuator so that the actuator moves the image pickup member to the predetermined stop position in accordance with the operation amount of the actuator, which is obtained by the operation amount obtaining section.

2. The image pickup device of claim 1, wherein the stop position information comprises temperature operation amount information in which the operation amount of the actuator is defined based on the operating property of the actuator, which is varied in response to the use environmental conditions including temperature,
the use environmental condition specifying section comprises a temperature detecting, section for detecting the temperature, and
the operation amount obtaining section obtains the operation amount of the actuator, which corresponds to the operating property of the actuator at the temperature detected by the temperature detecting section, from the temperature operation amount information of the stop position information.

3. The image pickup device of claim 1, wherein the stop position information comprises direction operation amount information in which the operation amount of the actuator is defined based on the operating property of the actuator, which is varied in response to the use environmental conditions including a moving direction of the image pickup member which is moved by the actuator,
the use environmental condition specifying section comprises a moving direction specifying section for specifying the moving direction of the image pickup member which is moved by the actuator, and
the operation amount obtaining section obtains the operation amount of the actuator, which corresponds to the operating property of the actuator in the moving direction of the image pickup member, the moving direction being specified by the moving direction specifying section, from the direction operation amount information of the stop position information.

4. The image pickup device of claim 1, wherein the stop position information comprises humidity operation amount information in which the operation amount of the actuator is defined based on the operating property of the actuator, which is varied in response to the use environmental conditions including humidity,
the use environmental condition specifying section comprises a humidity detecting section for detecting the humidity, and
the operation amount obtaining section obtains the operation amount of the actuator, which corresponds to the operating property of the actuator at the humidity detected by the humidity detecting section, from the humidity operation amount information of the stop position information.

5. The image pickup device of claim 1, wherein the storing section stores distance information relating to an image pickup distance from the image pickup section to the subject in association with the stop position of the image pickup member,
the image pickup device further comprises:
a distance measuring section for measuring the image pickup distance; and
a stop position specifying section for specifying the stop position of the image pickup member from the distance information stored in the storing section, the distance information corresponding to the image pickup distance, based on the image pickup distance measured by the distance measuring section, and
wherein the operation amount obtaining section obtains the operation amount of the actuator, which corresponds to the stop position specified by the stop position specifying section, from the stop position information stored in the storing section.

6. The image pickup device of claim 1, wherein at least two of the actuators are provided, the first actuator is configured to be capable of an operation control with high precision, and the second actuator is configured to have an operating range wider than the first actuator.

7. An image pickup device, comprising:
   a movable image pickup member which configures an image pickup section for performing an image pickup of a subject;
   an actuator which deforms by being supplied with electric power to move the image pickup member and in which an operating property for the supply of the electric power is varied in response to use environmental conditions of the image pickup device;
   a controlling section for controlling an operation of the actuator;
   a storing section for storing stop position information comprising direction operation amount information in which an operation amount of the actuator for moving the image pickup member to a predetermined stop position is defined based on an operating property of the actuator, which corresponds to at least one of the use environmental conditions of the image pickup device;
   a use environmental condition specifying section for specifying the at least one of the use environmental conditions of the image pickup device, the use environmental condition specifying section comprising a moving direction specifying section for specifying a moving direction of the image pickup member Which is moved by the actuator; and
   an operation amount obtaining section for obtaining the operation amount of the actuator from the stop position information stored in the storing section based on the operating property of the actuator, the operating property of the actuator, corresponding to the at least one of the use environmental conditions specified by the use environmental condition specifying section, the operation amount of the actuator corresponding to the operating property of the actuator in the moving direction of the image pickup member, the moving direction being specified by the moving direction specifying section, from the moving operation amount information of the stop position information;
   wherein the controlling section controls an operation of the actuator so that the actuator moves the image pickup member to the predetermined stop position in accordance with the operation amount of the actuator, which is obtained by the operation amount obtaining section.

8. The image pickup device of claim 7, wherein the stop position information comprises humidity operation amount information in which the operation amount of the actuator is defined based on the operating property of the actuator, which is varied in response to the use environmental conditions including humidity,
   the use environmental condition specifying section comprises a humidity detecting section for detecting the humidity, and
   the operation amount obtaining section obtains the operation amount of the actuator, which corresponds to the operating property of the actuator at the humidity detected by the humidity detecting section, from the humidity operation amount information of the stop position information.

9. The image pickup device of claim 7, wherein the storing section stores distance information relating to an image pickup distance from the image pickup section to the subject in association with the stop position of the image pickup member,
   the image pickup device further comprises:
      a distance measuring section for measuring the image pickup distance; and
      a stop position specifying section for specifying the stop position of the image pickup member from the distance information stored in the storing section, the distance information corresponding to the image pickup distance, based on the image pickup distance measured by the distance measuring section, and
   wherein the operation amount obtaining section obtains the operation amount of the actuator, which corresponds to the stop position specified by the stop position specifying section, from the stop position information stored in the storing section.

10. The image pickup device of claim 7, wherein at least two of the actuators are provided, the first actuator is configured to be capable of an operation control with high precision, and the second actuator is configured to have an operating range wider than the first actuator.

* * * * *